United States Patent [19]

Jayne et al.

[11] Patent Number: 4,584,972
[45] Date of Patent: Apr. 29, 1986

[54] DYNAMIC COMPRESSION INTERNAL COMBUSTION ENGINE WITH YOKE HAVING AN OFFSET ARCUATE SLOT

[76] Inventors: Michael E. Jayne, 1 River St., Belchertown, Mass. 01007; Peter D. Anderson, 27 High Point Dr.; James T. Hoffman, 260 Grantwood Dr., both of Amherst, Mass. 01002; Robert B. Gray, 71 Gulf Rd., Belchertown, Mass. 01007

[21] Appl. No.: 684,576

[22] Filed: Dec. 21, 1984

[51] Int. Cl.⁴ .............................................. F02B 75/32
[52] U.S. Cl. .............................. 123/56 C; 123/197 AC
[58] Field of Search .............. 123/56 R, 56 C, 197 R, 123/197 A, 197 AB, 197 AC

[56] References Cited

U.S. PATENT DOCUMENTS

| | | | |
|---|---|---|---|
| 283,558 | 8/1883 | Baumgarten | 123/197 AC |
| 1,349,660 | 8/1920 | Buhl | 123/197 AC |
| 1,505,856 | 8/1924 | Briggs | 123/197 AC |
| 1,572,918 | 2/1926 | Geddes | 123/197 AC |
| 4,449,494 | 5/1984 | Beaudoin | 123/56 C |
| 4,466,403 | 8/1984 | Menton | 123/197 AC |

Primary Examiner—Craig R. Feinberg
Attorney, Agent, or Firm—Craig and Burns

[57] ABSTRACT

An internal combustion engine has a cylinder with a first axis, a piston housing therein and connected to a yoke housing having a sliding block within a slot in the yoke which slot is curved about a center of curvature with the concave side of the slot facing away from the combustion chamber and offset from the vertical axis of the combustion chamber, the curve's radius being such as to provide a power stroke having a time period which exceeds the time period of a compression stroke.

14 Claims, 63 Drawing Figures

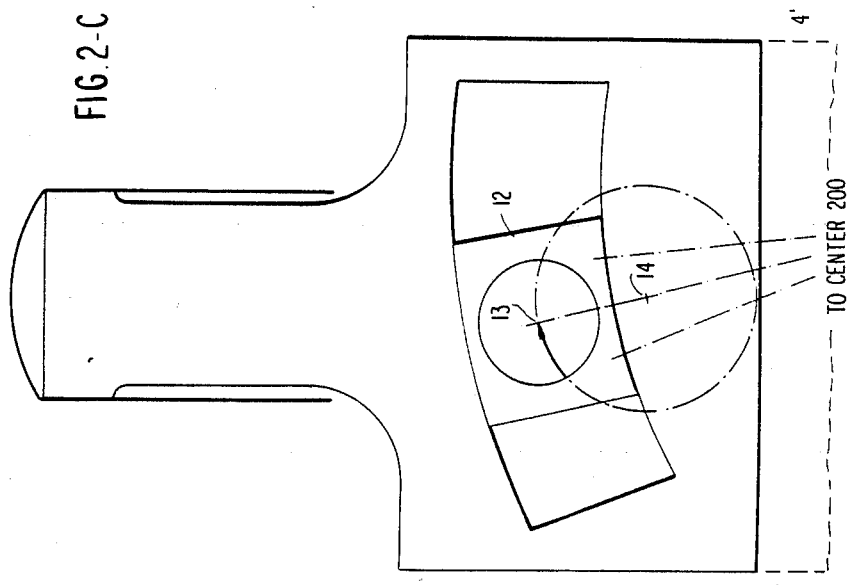
FIG. 2-C
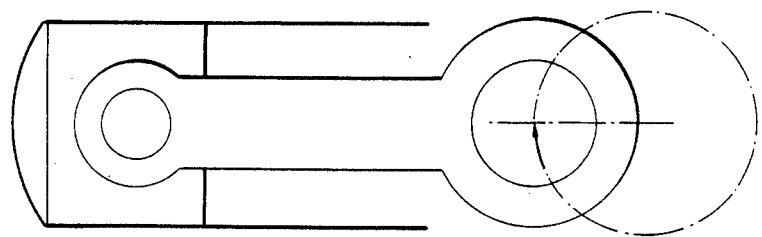
FIG. 2-B
FIG. 2-A
PRIOR ART

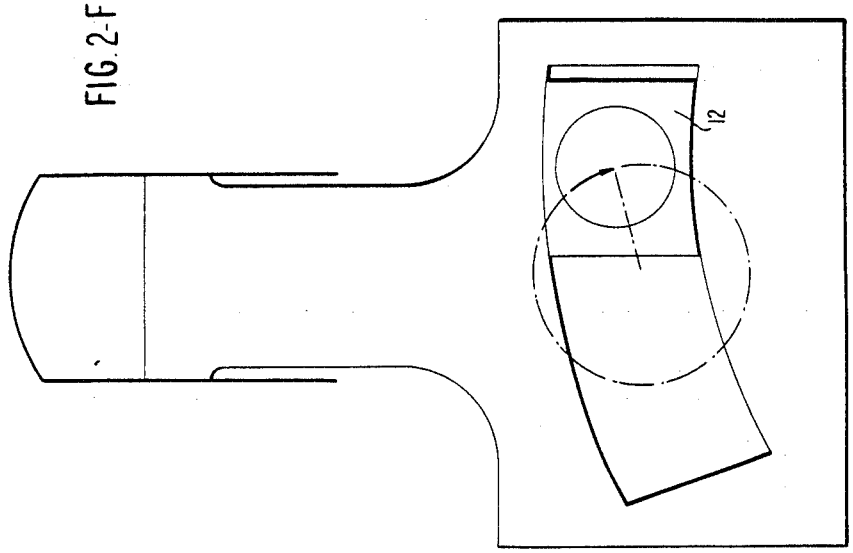
FIG. 2-F
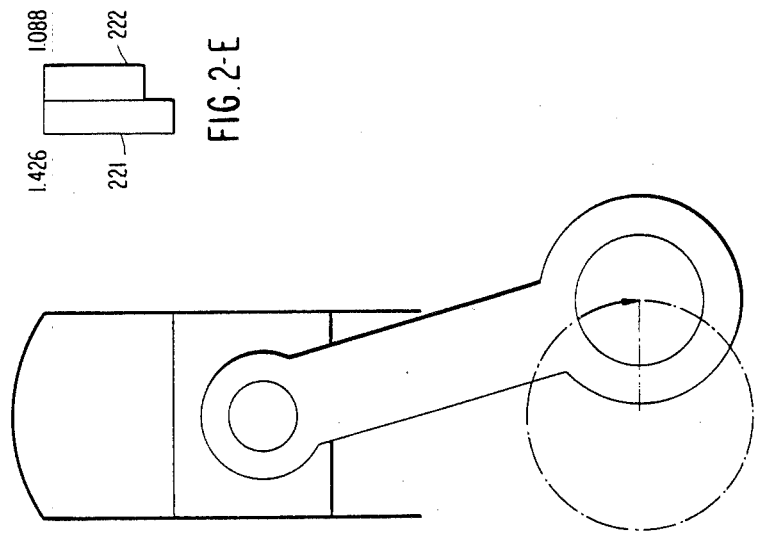
FIG. 2-E
FIG. 2-D
PRIOR ART

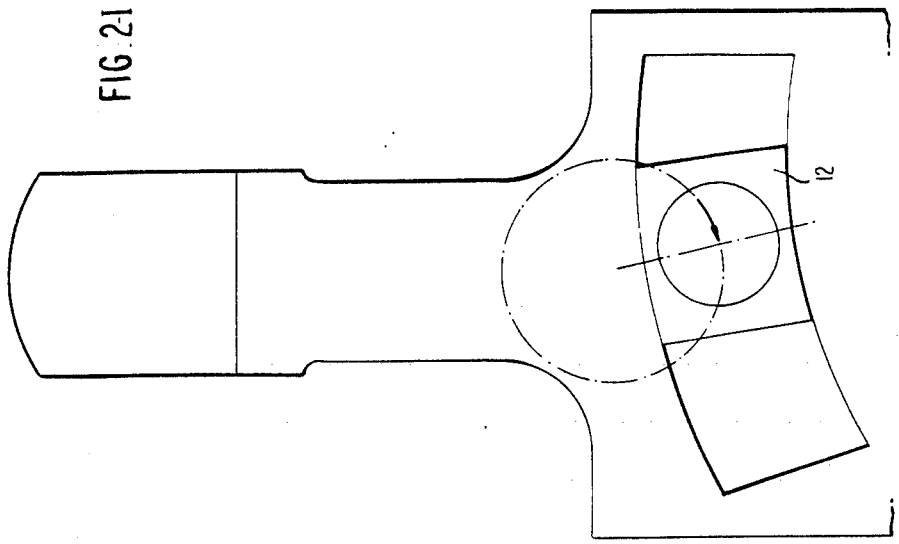
FIG. 2-I
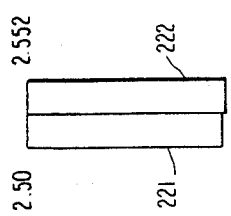
FIG. 2-H
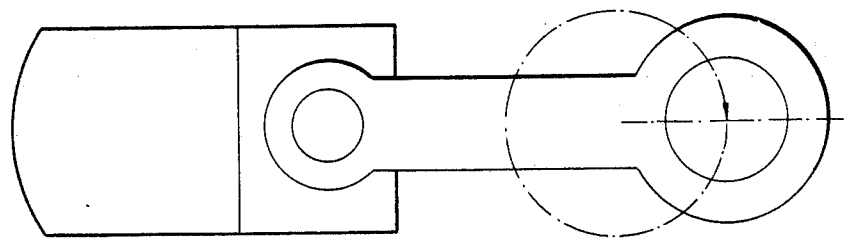
FIG. 2-G
PRIOR ART

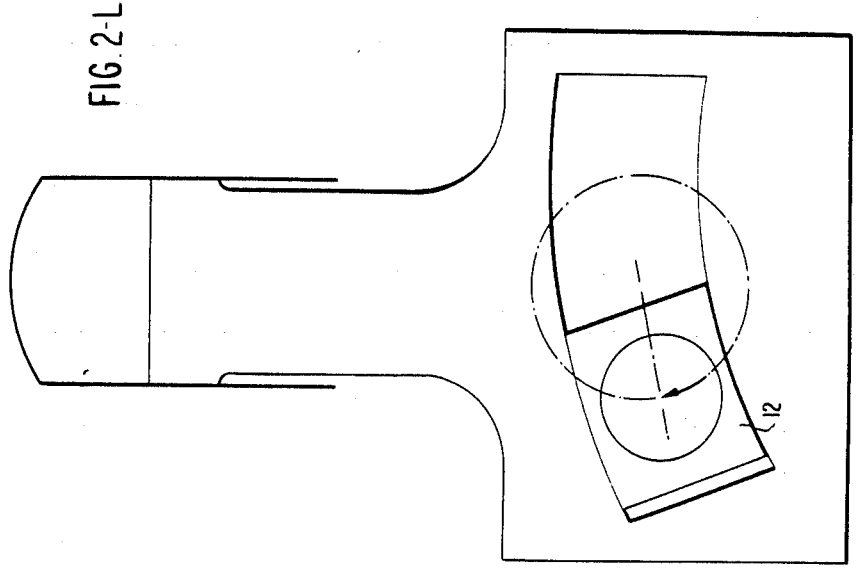
FIG. 2-L
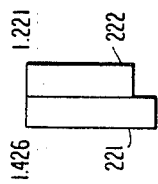
FIG. 2-K
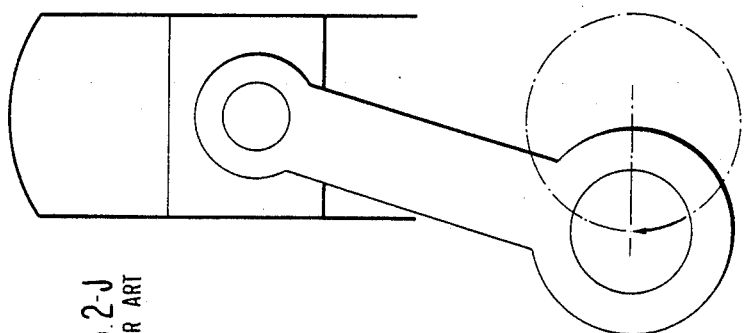
FIG. 2-J
PRIOR ART

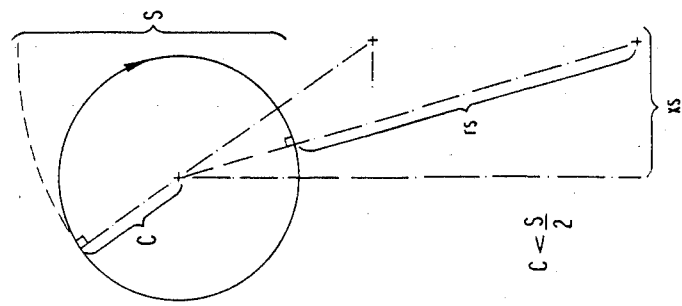
FIG. 2-O
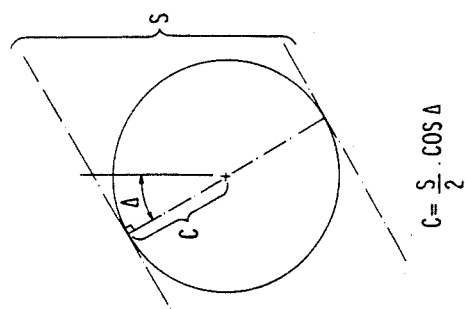
FIG. 2-N
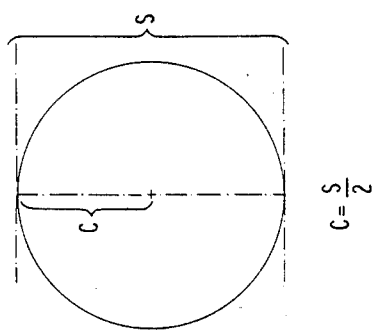
FIG. 2-M

FIG.3-A

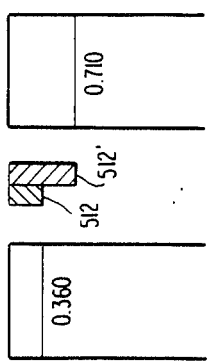
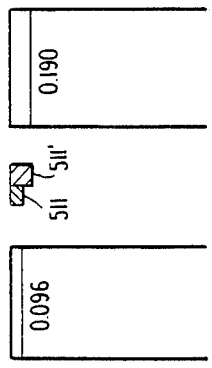
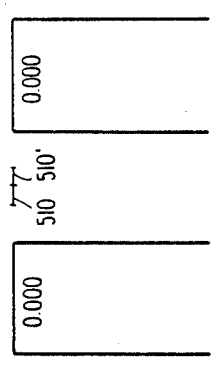
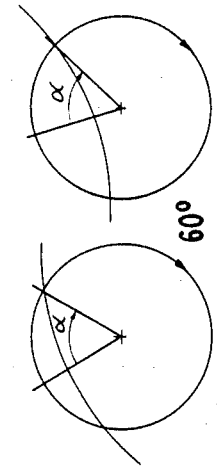
FIG.12-I PRIOR ART
FIG.12-G
FIG.12-F PRIOR ART
FIG.12-D
FIG.12-C PRIOR ART
FIG.12-A

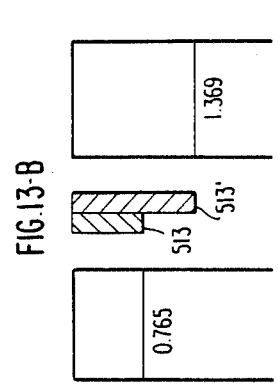
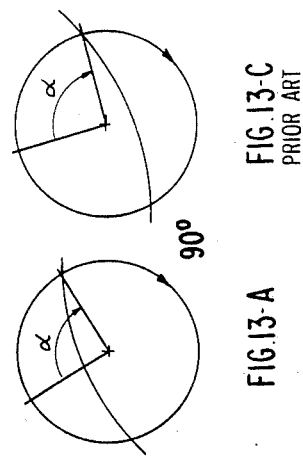
FIG.13-A  FIG.13-B  FIG.13-C PRIOR ART
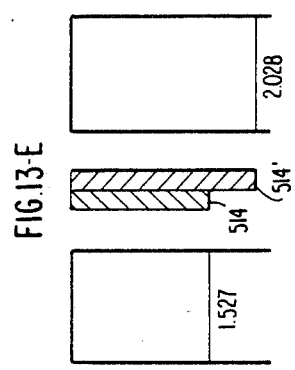
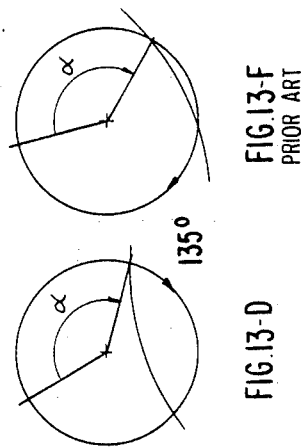
FIG.13-D  FIG.13-E  FIG.13-F PRIOR ART
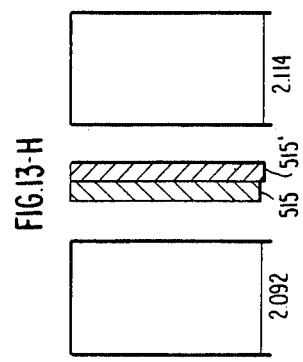
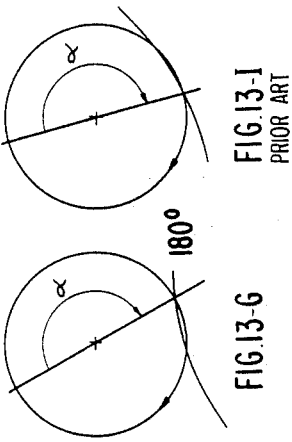
FIG.13-G  FIG.13-H  FIG.13-I PRIOR ART

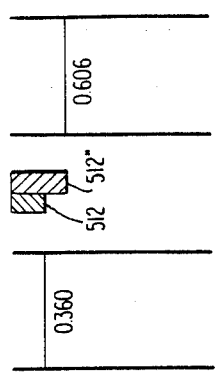
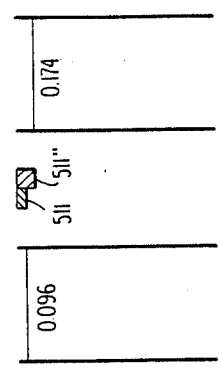
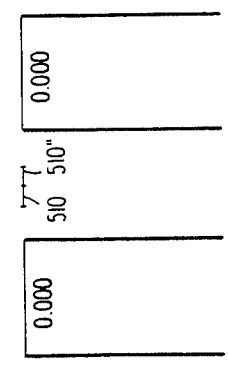
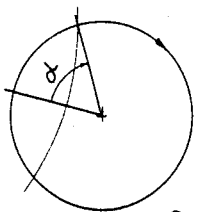
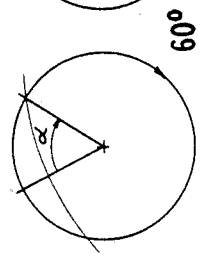
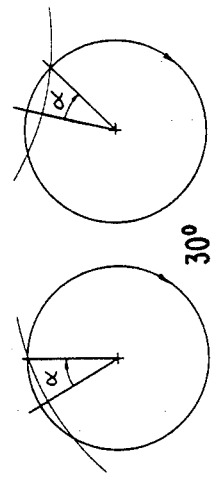
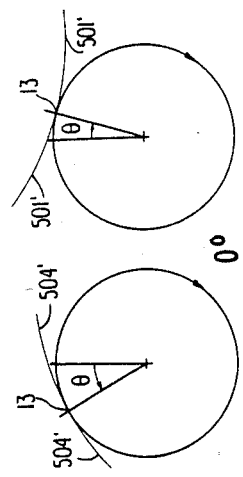

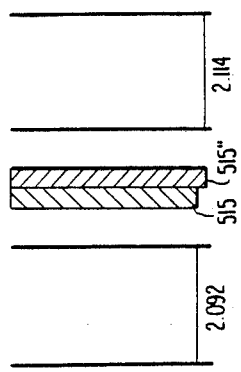
FIG.15-H
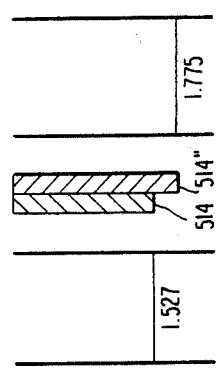
FIG.15-E
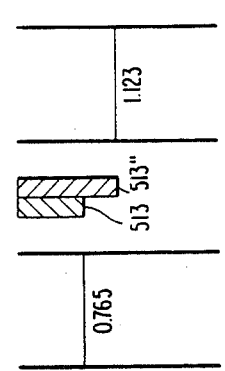
FIG.15-B
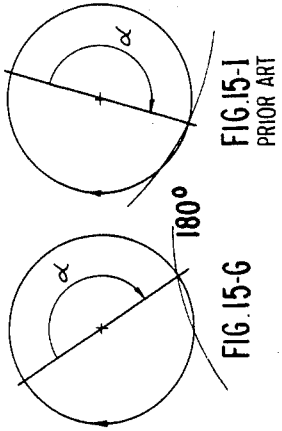
FIG.15-I PRIOR ART
FIG.15-G
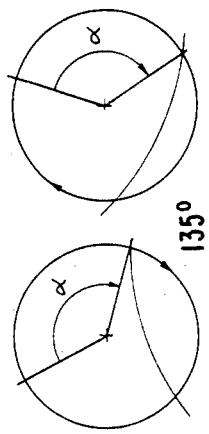
FIG.15-F PRIOR ART
FIG.15-D
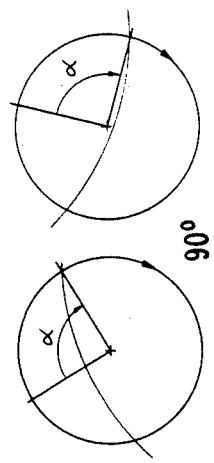
FIG.15-C PRIOR ART
FIG.15-A

DYNAMIC COMPRESSION INTERNAL COMBUSTION ENGINE WITH YOKE HAVING AN OFFSET ARCUATE SLOT

This invention relates to internal combustion engines and, more specifically, to internal combustion engines employing a scotch yoke, at least one of which is disclosed in U.S. Pat. No. 4,013,048 issued Mar. 22, 1977 to Daniel M. Reitz.

In certain of the prior art engines, for example that disclosed by Reitz, pairs of cylinders with each pair coaxially aligned and disposed back to back with the piston rods extending from the pistons reciprocating in each of the pairs of cylinders are coaxially aligned and joined by a yoke. The center of the yoke is transversely slotted to receive the throw of a crank so that, as each pair of pistons and their yoke-joined piston rods reciprocate as a unit, the crank throw will not only reciprocate with and in the direction of the yoke but will also reciprocate transversely in the yoke slot. The crankshaft thus receives a desired rotary driving motion from the reciprocation of the paired pistons.

The relationship of the piston rods, yoke and the throw of the crankshaft in a scotch yoke engine are such that the acceleration of the piston rod departing from top dead center is slower for a given angular displacement of the crankshaft when compared to the comparable action in a conventional internal combustion engine of the kind wherein the piston is connected to the crankshaft throw by means of a wrist pin and connecting rod.

This results in maintaining the fuel air mixture under higher pressure for a longer period of time compared to that for the conventional engine described, thereby facilitating a more complete burning earlier in the cycle.

At the same time, less cylinder wall is exposed during burning during such movement compared to the comparable action in the described conventional internal combustion engine, resulting in lower thermal losses through the cylinder wall which, in turn, translates to improved overall thermal efficiency with attendant increase in the amount of power available per each unit of fuel and air burned.

Other parameters being equal, a scotch yoke engine may be expected to exhibit a lower exhaust gas temperature compared to the described conventional internal combustion engines.

While the prior art, as exemplified by the Reitz patent, addressed the problem of minimizing the number of parts in an engine, the resulting engines proved difficult to produce and to maintain. The configuration of the members in a scotch yoke engine of the prior art results in excessive wear and resulting destabilization, that is, misalignment of the piston and yoke within the cylinder and crankcase as contrasted to operation of comparable engines of the wrist pin and connecting rod type.

Employed in a two-stroke cycle, the prior art engines required complicated seals while the use of opposing cylinders makes for unconventional space requirements for the engine and attendant complications for maintenance and repair.

Further, the premixing of oil with gas for two-stroke cycle operation results in engine operation with unacceptably high pollution according to existing pollution standards imposed by law. Endeavors to comply with emission standards now in force make the prior art engines of the Reitz type unacceptable to the public.

The U.S. Pat. No. 1,349,660 to Buhl, issued Aug. 17, 1920, for clockwise or counter clockwise revolution as shown describes a power stroke for a yoke which has a greater time period than the time period for the return or compression stroke, however, mathematical analysis of his structure reveals that it would fail to produce the desired effect of slowing down the power stroke and speeding up the compression stroke during the relevant portion of the cycle.

The center of curvature of the curvilinear slot is located on the piston side of the crankshaft.

Further, the Buhl disclosure shows a radius of curvature for the curved slot which is substantially identical in magnitude to the cylinder diameter. Such a configuration is subject to excessive and rapid wear as a result of the short radius of the curved slot and the related pronounced offset of the center of curvature of the slot with respect to the cylinder axis. The short radius of the curved slot also induces an excessive vibration into the system even at very low speeds.

The U.S. patent to Baumgarten, Ser. No. 283,558 issued Aug. 21, 1883, shows a yoke mounted to a steam engine, the yoke having a curvilinear slot within which a cross piece of the crank extends. The Baumgarten slot is wider than the cross piece and fails to contain simultaneously the cross piece on opposite sides thereof. The irregular shaped curvilinear slot of Baumgarten is expensive to manufacture. The fact that it does not positively restrain the cross piece within the slot makes it subject to excessive wear and vibration during operation.

Similarly, British Pat. No. 152,799 to Cummings discloses a yoke with curvilinear slot in which a bush mounted upon a crank pin oscillates. The center of curvature of the curvilinear slot of Cummings is also disposed on the piston side of the crankshaft. Again, the complex curvilinear shape of the Cummings slot is expensive and difficult to manufacture, at the same time, during operation being subjected to excessive wear by virtue of the fact that the bush, during its excursion from one end of the slot to the other has only a point bearing rather than a surface bearing thus increasing the load at the point bearing with attendant wear upon slot and bush.

German Offenlegungsschrift No. 2,252,277, Anmeldetag Oct. 25, 1972, to Wegner shows a non-rectilinear slot having two straight sections angularly disposed with respect to each other in a yoke in which a crank pin, with point bearings, oscillates. Complexities of manufacture of the irregularly shaped slot together with excessive wear induced by the point or line contact of bearings of the crank pin against the inner edges of the slots may be expected to produce excessive wear and attendant unsatisfactory operation after a period of time.

British Pat. No. 576,546, Apr. 9, 1946, to Williams shows a yoke with a cam track disposed angularly with respect to the axis of the cylinder, with engages flanges and rollers mounted for rotation with respect to a crank pin. Although Williams avoids the irregular motion of his carriage device by provision of motion along a straight line cam track, the point contact of the bearings of the rollers nevertheless are subject to excessive friction with attendant wear. The cam track, as shown, is set at an angle of 45° with respect to the axes of the cylinders resulting in substantial forces lateral to the axes of the cylinders which are imparted from the cross head member by way of the rollers to the carriage, forces which result in increased wear due to the use of the rollers with their attendant point contact bearings against the cross head.

In accordance with the invention a scotch yoke engine is provided with a slot in the yoke configured to provide a compression stroke which is faster than the power stroke by configuring the slot in the yoke, rather slightly radially curved, of uniform radius, with the convex side of the yoke facing the piston and the concave side facing the lower or crankcase end of the engine with the center of curvature of the curve being offset from the axis of the cylinder and remote from the piston as compared to the crankshaft.

Accordingly, it is an object of the invention to produce a scotch yoke internal combustion engine which overcomes the deficiencies in the prior art.

It is a further object of the invention to provide a scotch yoke internal combustion engine for fractional and multi-horse power vehicles, both for land and air travel.

It is another object of the invention to provide a scotch yoke internal combustion engine useful for static power plants of fractional and multi-horse power sizes.

It is an object of the invention to produce an internal combustion engine of the scotch yoke type capable of operating on a two-stroke cycle operation.

It is another object of the invention to produce an internal combustion engine of the scotchyoke type operating on a four-stroke operation.

It is another object of the invention to produce an internal combustion engine of the scotch yoke type useful in fuel injection or diesel operation.

It is another object of the invention to provide an internal combustion engine of the scotch yoke type designed for ease in manufacture.

It is another object of the invention to provide an internal combustion engine of the scotch yoke type designed for ease in retrofitting existing engines of conventional construction to provide them with scotch yoke structure and operation.

It is another object of the invention to provide an internal combustion engine of the scotch yoke type having a multiple number of cylinders.

It is another object of the invention to provide an internal combustion engine having a piston with a yoke mounted to the piston for movement along the axis of the cylinder with a curved slot of fixed radius having a concave side of the curve facing away from the combustion chamber to produce the improved dynamic compression ratio. If the concave side is faced towards the combustion chamber the piston movement is identical to an engine employing a connecting rod of the same length at the radii extending from its axis to the center of the curved slot.

Another object of the invention is to produce an internal combustion engine having a piston with a yoke mounted to the piston for movement along the axis of the cylinder, and a radially curved slot with the center of curvature of the curved slot being located on the far side of the crankshaft axis with respect to the piston.

Another object of the invention is the provision of apparatus for an internal combustion engine having a yoke and a sliding block engaging the yoke and a crank throw mounted within the sliding block, the disposition of the path of the sliding block within the yoke effecting a quick compression stroke and a slow power stroke.

It is another object of the invention to provide apparatus for an internal combustion engine having a yoke and a sliding block engaging the yoke and a crank throw mounted within the sliding block, the path of the sliding block being radially curved with the concave side of the curve facing away from the combustion chamber with an offset of the center of curvature from the axis of the cylinder for the slot in order to provide an improved longer and slower power stroke with concomitant shorter and faster compression stroke, the curve being of such radius, and the location of the center for which, is such that possible increases in friction of the bearing surfaces of the yoke and the crankcase wall, and the yoke and the sliding block do not offset the advantages gained by increased length and/or time of power stroke.

These and other objects, features and advantages of the present invention will become more apparent from the following description when taken in connection with the accompanying drawings which show, for the purposes of illustration, plural embodiments in accordance with the present invention and wherein.

FIGS. 2A to 2D and E show, for comparison, the piston movements during a cycle of a conventional connecting rod engine and for a yoke engine according to the invention.

Figure 3:
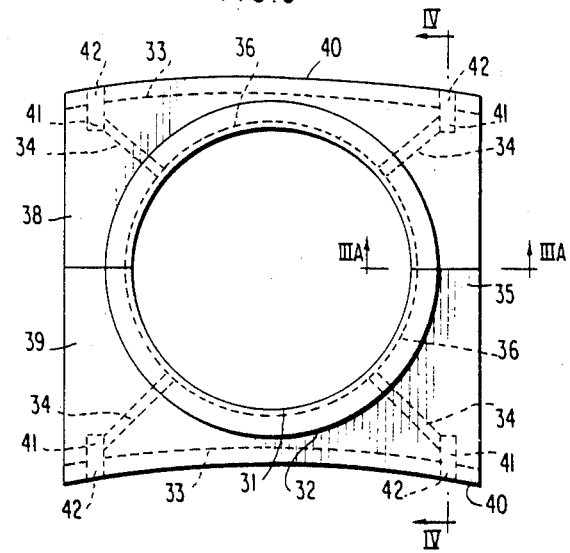

FIG. 3 shows a side view of a sliding block with crank throw for use with the present invention.

FIG. 3A shows a detail of a sliding block.

Figure 4:
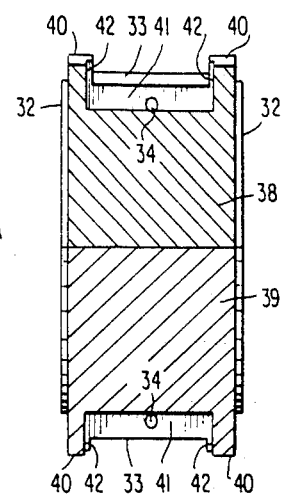

FIG. 4 shows a cross section view of a sliding block taken through lubrication cross channels as seen in FIG. 3.

Figure 5:
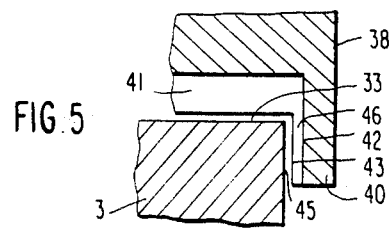

FIG. 5 shows a detail of the relationship of the yoke and the sliding block.

Figures 6, 7:
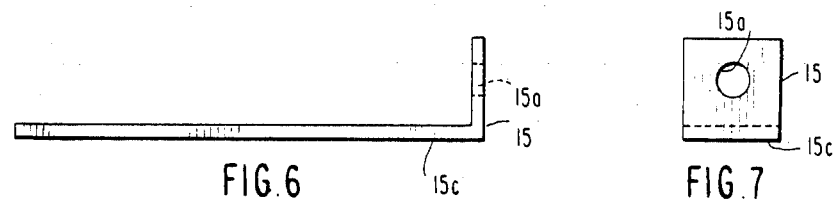

FIGS. 6 and 7 show, respectively, side view and end view of a bearing member of the type which may be assembled to the yoke.

Figures 8, 9:
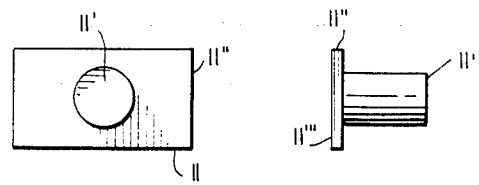

FIGS. 8 and 9 show, respectively, top and side views of a bearing shoe.

Figure 10:
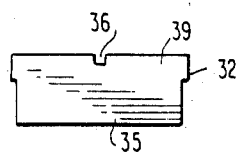
Figure 10:
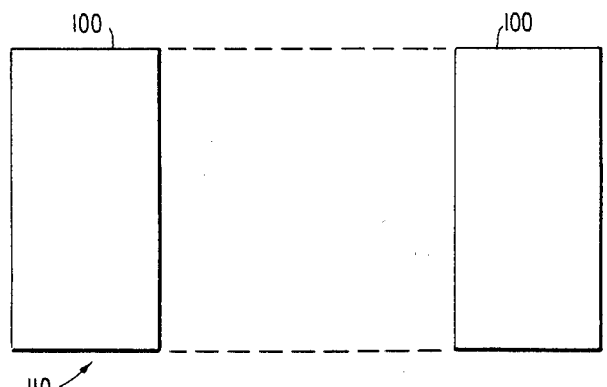

FIG. 10 shows an embodiment of the invention comprised of a multi-cylinder engine.

FIGS. 11-15 are schematic diagrams for the purpose of comparing operation of the invention with that of an example of the prior art, specifically the Buhl patent.

Figure 1:
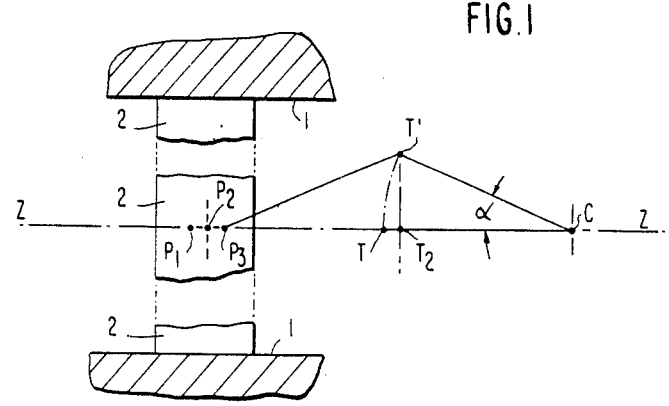
FIG. 1 shows a diagram wherein the movement of a scotch yoke piston with respect to the cylinder is compared to comparable movement of a piston employing connecting rod and wrist pin structure.

Turning now to a consideration of the figures of the drawings wherein like elements are represented by like reference characters, and more specifically to a consideration of FIG. 1, the figure shows a diagram useful in evaluating the characteristics of engines employing a scotch yoke mechanism compared to the connecting rod and wrist pin mechanism.

The crankshaft axis is designated by C and the center of the throw, at top dead center, is designated T. The length of a connecting rod to the wrist pin in a conventional engine is represented by the line $P_1$–T. When the crankshaft rotates by the angle alpha, the throw moves from T along the arc to T'. The connecting rod is moved to a position T'–$P_3$.

In contrast, in a scotch yoke mechanism wherein the throw T is at top dead center, rotation of the throw to T' causes translation of the yoke to a point $T_2$ and the corresponding movement of the piston $P_1$–$P_2$ will be identical in magnitude to the aforesaid translation so that any portion of the piston will also be translated along the axis of the cylinder by the distance T-T₂.

From the foregoing, it will be apparent that for identical rotational movement of the crankshaft in the vicinity of top and bottom dead center, the scotch yoke mechanism will move the piston within the cylinder by a smaller distance than that caused by the comparable movement of a conventional connecting rod/wrist pin mechanism.

The effect of the phenomenon in the scotch yoke engine is to cause the fuel/air mixture to be under higher compression for a longer period of time, that is, for a given angle of rotation compared to that effected by the conventional mechanism, resulting in more complete burning of the fuel/air mixture.

Additionally, the distance $P_1$-$P_2$ is a measure of the amount of surface of the cylinder walls exposed by the movement of the yoke through a crank rotation of an angle alpha which is smaller than the distance $P_1$-$P_3$ representing the exposed portion of the cylinder walls created by rotation of a crank from top dead center through an angle alpha in a conventional connecting rod/wrist pin engine.

Accordingly, thermal efficiency is better in the scotch yoke engine, by virtue of lower thermal losses through the cylinder walls for a particular period of time, compared to the conventional engine.

Considering now the invention, it will be appreciated that ignition, carburetion, fuel injection or the like, lubrication and other operations ancillary to engine operation will be performed in accordance with practice known to those skilled in the art.

Figure 2:
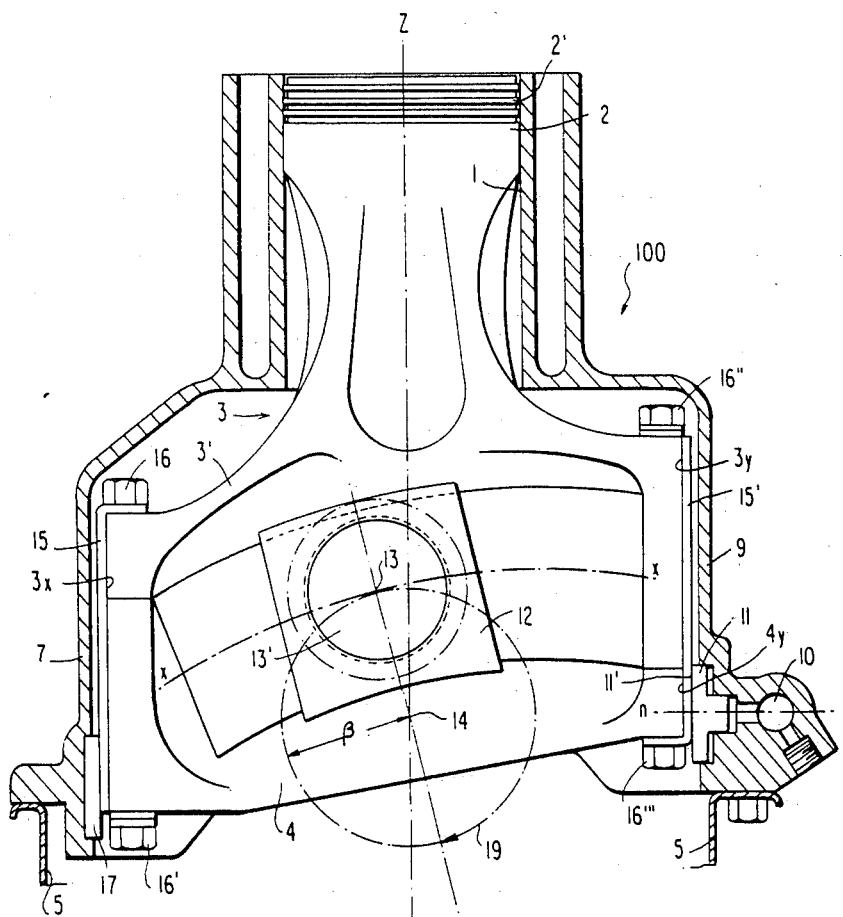
FIG. 2 shows an embodiment of the invention for a single cylinder of a scotch yoke engine.
Figure 2:
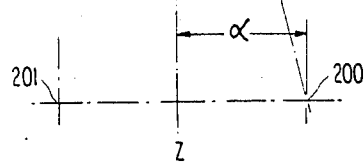

FIG. 2 shows an embodiment of the invention for a single cylinder of an engine generally designated by the reference numeral 100. The cylinder walls 1 contain the piston 2, with piston rings 2', to which is mounted the upper member 3, 3' of a yoke 3, 3', 4.

It will be appreciated by those skilled in the art that the member 3 may be mounted to the piston 2 by any means, for example, by welding, brazing, bolting or the like. Alternatively, the piston 2 and the upper part 3' of the yoke 3, may be cast as a single piece as shown in FIG. 2. The yoke is completed by a lower member 4 mounted to the upper member 3, 3', by nut and bolt or other fastening assemblies 16, 16', 16" and 16'".

The crankcase 5, 7 and 9 has a housing which may be composed of plural members designed for appropriate assembly for retrofitting and maintenance in a manner known to those skilled in the art. The respective members may be joined by any means conventional in the art.

The reference numeral 14 designates the center of rotation of the crankshaft while 13 designates the center of the crank throw 13'.

The motion effected by the yoke 3, 3', 4 is translated to the crank throw 13' by means of sliding block 12 which is mounted to engage the upper and lower surfaces of yoke members 3, 4. During the linear movement of piston 2 and yoke members 3 and 4, from top dead center to bottom dead center and back, the crank throw 13' which is received by the sliding block 12, will describe a rotational motion about the center 14 by means of the sliding block 12 reciprocating in its excursions along a curvilinear path x—x, the center 200 of curvature for x—x being offset with respect to the cylinder axis z—z.

The offset distance may take any one of a variety of magnitudes; for example, the center of curvatures may be located along the line defined by prints 200 and 201, to the left, central on z—z, or to the right of the cylinder axis z—z, for the direction of crank rotation shown in FIG. 2.

As shown, the offset of center 200 is to the right on the side of the axis z—z contiguous to the crank throw 13' during its power stroke from top dead center for the clockwise rotation as shown in FIG. 2. This results in the curve in the yoke slot being tilted such that the flat part of the curve is on the right and the steep part is on the left as seen in FIG. 2 for clockwise crank rotation. For counter clockwise crank rotation, the reverse will be true, that is, the part of the curve perpendicular to the cylinder axis will be on the left and the oblique part will be on the right.

A counter-intuitive result is achieved by the arc of the slot in the yoke according to the invention as shown in FIG. 2. Such a tilt causes top dead center, the point at which the piston rises highest within the cylinder, to occur considerably earlier relative to crank rotation. This results in an extended duration of the time period of combustion. Tilting in the opposite direction would cause the top dead center to occur at a later crank position, thus shortening the duration of the cumbustion cycle.

As a result of curving and tilting the yoke, the distance of piston travel for a given crankshaft radius changes to be slightly greater than 2R where R is radius of crank throw. To achieve a given length of piston travel, the crank radius would have to be adjusted accordingly, this may be effected by establishing a stroke length and then employing the equations of Tables 1 and 4 to determine the crank pin offset.

The center 200 of curvature is disposed remote from the piston 2 with respect to the axis of the crankshaft at 14.

Bearing in mind the clockwise direction of rotation of the crankshaft indicated at 19, passage of the throw 13' from top dead center beginning before the crank throw passes the axis of the cylinder and, as will be explained later, will provide a power stroke of greater duration than the duration of the compression stroke upon return. It is apparent from FIG. 2, therefore, that the time afforded for burn is proportionately greater than the time afforded compression.

Because the piston 2 and yoke 3, 4, as shown, are integral and stabilized between the two sides of the crankcase 39, no piston slap occurs as might be the case with a conventional engine employing connecting rods and wrist pins.

In contrast to the prior art, in the invention as shown, the slot is positioned within the yoke with an offset distance alpha ($\alpha$) as shown in FIG. 2, the offset distance together with the curvature of the slot creating the difference in time periods between power stroke and compression stroke. The magnitude of the offset distance alpha ($\alpha$), as shown, is only exemplary, however if increased excessively, as for example, to a value greater than the magnitude of the crank throw beta ($\beta$), substantial lateral forces against the members 11 and 17 by the bearing members 15 and 15' may result in excessive frictional losses. It thus becomes a trade off, as the offset distance alpha ($\alpha$) increases, the increase of alpha ($\alpha$) changing the ratio of the power stroke time interval compared to the compression stroke time interval, at the same time increasing losses due to friction and creating excessive wear on the bearings provided for the yoke.

Similarly, a change in the radius of curvature for the slot in the yoke will produce concomitant changes in the power and compression strokes.

Calculations for a comparison of the piston displacement for the offset yoke engine of the invention with a conventional wrist pin connecting rod engine can be effected employing the formulas of Table 1 below.

Concerning the parameters of stroke length, rod length, crank radius for rod, crank radius for offset of yoke, absolute yoke arc offset and absolute yoke arc radius, the dimensions are designated in inches. The data for relative yoke arc offset and relative yoke arc radius are dimensionless numbers having magnitudes with relation to each other, for example, in one com-

TABLE 1

Computation of Piston Travel for Offset Arcuate Slot Engine vs. Connecting Rod Engine (See FIGS. 2A–2D)

| | IMPROVED DYNAMIC COMPRESSION RATIO ENGINE | CONNECTING ROD ENGINE |
|---|---|---|
| Crank Angle (from vertical at TDC | $\theta = -\text{ARCSIN}\left(\dfrac{rc}{rs - rc}\right)$ | $\theta = 0°$ |
| Piston travel from TDC as function angle of crank rotation past $\theta$ | $y = rc \cdot \cos\theta - \sqrt{rs^2 - (rc \cdot \sin\theta - xs)^2} - (rc \cdot \cos(\theta + \alpha) - \sqrt{rs^2 - (rc \cdot \sin(\theta + \alpha) - xs)^2})$ | $r - r \cdot \cos\theta + 1 - \sqrt{l^2 - (r \cdot \sin\theta)^2}$ |

| | SYMBOL | MEANING |
|---|---|---|
| Variables | y | piston travel |
| | $\alpha$ | angle of crank rotation past $\theta$ |
| | $\theta$ | crank angle from TDC |
| | rc | radius of crank bearing path |
| Constants | rs | radius of yoke slot arc |
| | xs | horizontal offset of yoke slot arc center |
| | l | length of the connecting rod |
| | r | crankpin offset radius for the connecting rod engine |

A computer simulation, reproduced below, presents data of the percentage increase in compression of (a) an engine having a yoke with a straight slot at right angles to the cylinder axis, (b) an engine having a yoke with an arcuate slot with no offset, that is, the center of the arcuate slot lying on the axis of the cylinder and (c) a yoke engine having an arcuate slot with an offset, each of the three compared to a conventional rod and crank engine.

Since the most relevant standards for comparing different engines are their compression ratios and displacements, and thus their stroke length, these parameters are held constant.

In the cases of the straight yoke, the centered arcuate yoke, and centered rod 4 crank engines, the crank radius is exactly ½ the stroke.

In the case of the tilted straight yoke engine, not shown, the crank radius is ½·COS $\theta$ times the stroke, where $\theta$ is the angle of tilt.

In the case of the tilted and arcuate yoke the relationship between the crank radius and stroke is complex. Computing the correct crank radius for a given stroke is made easier if the yoke slot radius and offset are specified in units of the (unknown) crank radius. The crank radius can then be computed, and from it the absolute measures of slot radius and offset. Though analytic methods can be used to this end, the computer simulation program computes the crank radius by performing a trial run with a predefined radius, finding the top and bottom of the stroke, then computing the scale factors necessary to map the stroke into the specified range. A second run using the scaled crank radius provides a stroke of the specified length.

puter run the relative yoke arc radius is eight times the relative yoke arc offset.

The angle designated is the angle starting from top dead center on the power stroke.

```
COMPRESSION RATIO: 11.000000
STROKE LENGTH: 2.500000
ROD LENGTH: 5.000000
RELATIVE YOKE ARC OFFSET: −1.000000
RELATIVE YOKE ARC RADIUS: 8.000000
CRANK RADIUS FOR ROD: 1.250000
CRANK RADIUS FOR OFFSET YOKE: 1.240038
ABSOLUTE YOKE ARC OFFSET: −1.240038
ABSOLUTE YOKE ARC RADIUS: 9.9203202
```

| | PERCENTAGE INCREASE IN COMPRESSION OF YOKES OVER ROD AND CRANK | | |
|---|---|---|---|
| ANGLE | STRAIGHT | CURVED | OFFSET CURVED |
| 0 | 0.000000 | 0.000000 | 0.000000 |
| 5 | 0.185524 | 0.280080 | 0.297260 |
| 10 | 0.720416 | 1.090296 | 1.127420 |
| 15 | 1.544709 | 2.347329 | 2.412355 |
| 20 | 2.573141 | 3.929978 | 4.034905 |
| 25 | 3.711330 | 5.700344 | 5.860063 |
| 30 | 4.870079 | 7.522932 | 7.753346 |
| 35 | 5.974859 | 9.279638 | 9.595990 |
| 40 | 6.969843 | 10.877455 | 11.292953 |
| 45 | 7.818007 | 12.251023 | 12.775232 |
| 50 | 8.498560 | 13.360184 | 13.999089 |
| 55 | 9.003582 | 14.186592 | 14.941985 |
| 60 | 9.334564 | 14.728577 | 15.598412 |
| 65 | 9.499522 | 14.997038 | 15.975383 |
| 70 | 9.510696 | 15.011325 | 16.089243 |
| 75 | 9.382887 | 14.796298 | 15.962110 |
| 80 | 9.132325 | 14.379748 | 15.619919 |
| 85 | 8.775798 | 13.791060 | 15.090640 |
| 90 | 8.330168 | 13.059759 | 14.402897 |
| 95 | 7.811983 | 12.214612 | 13.585059 |
| 100 | 7.237299 | 11.283256 | 12.664751 |
| 105 | 6.621415 | 10.291705 | 11.668287 |
| 110 | 5.978875 | 9.264050 | 10.620395 |
| 115 | 5.323273 | 8.222481 | 9.544059 |

-continued

COMPRESSION RATIO: 11.000000
STROKE LENGTH: 2.500000
ROD LENGTH: 5.000000
RELATIVE YOKE ARC OFFSET: −1.000000
RELATIVE YOKE ARC RADIUS: 8.000000
CRANK RADIUS FOR ROD: 1.250000
CRANK RADIUS FOR OFFSET YOKE: 1.240038
ABSOLUTE YOKE ARC OFFSET: −1.240038
ABSOLUTE YOKE ARC RADIUS: 9.9203202

| | PERCENTAGE INCREASE IN COMPRESSION OF YOKES OVER ROD AND CRANK | | |
|---|---|---|---|
| ANGLE | STRAIGHT | CURVED | OFFSET CURVED |
| 120 | 4.667292 | 7.187009 | 8.460329 |
| 125 | 4.022595 | 6.175779 | 7.388258 |
| 130 | 3.399830 | 5.204819 | 6.345040 |
| 135 | 2.808606 | 4.288196 | 5.345957 |
| 140 | 2.257495 | 3.438270 | 4.404358 |
| 145 | 1.754088 | 2.665596 | 3.531961 |
| 150 | 1.304957 | 1.979151 | 2.738774 |
| 155 | 0.915686 | 1.386413 | 2.033282 |
| 160 | 0.590967 | 0.893509 | 1.422583 |
| 165 | 0.334553 | 0.505288 | 0.912387 |
| 170 | 0.149363 | 0.225436 | 0.507269 |
| 175 | 0.037443 | 0.056494 | 0.210585 |
| 180 | 0.000000 | 0.000000 | 0.024698 |

COMPRESSION RATIO: 11.000000
STROKE LENGTH: 2.500000
ROD LENGTH: 5.000000
RELATIVE YOKE ARC OFFSET: −1.000000
RELATIVE YOKE ARC RADIUS: 15.500000
CRANK RADIUS FOR ROD: 1.250000
CRANK RADIUS FOR OFFSET YOKE: 1.247385
ABSOLUTE YOKE ARC OFFSET: −1.247385
ABSOLUTE YOKE ARC RADIUS: 19.334464

| | PERCENTAGE INCREASE IN COMPRESSION OF YOKES OVER ROD AND CRANK | | |
|---|---|---|---|
| ANGLE | STRAIGHT | CURVED | OFFSET CURVED |
| 0 | 0.000000 | 0.000000 | 0.000000 |
| 5 | 0.185524 | 0.234351 | 0.235865 |
| 10 | 0.720416 | 0.910912 | 0.915482 |
| 15 | 1.544709 | 1.957425 | 1.967083 |
| 20 | 2.573141 | 3.268900 | 3.287874 |
| 25 | 3.711330 | 4.727980 | 4.760062 |
| 30 | 4.870079 | 6.221862 | 6.271606 |
| 35 | 5.974859 | 7.653665 | 7.725040 |
| 40 | 6.969843 | 8.949457 | 9.045506 |
| 45 | 7.818007 | 10.058273 | 10.181647 |
| 50 | 8.498560 | 10.950357 | 11.102240 |
| 55 | 9.003582 | 11.613394 | 11.794019 |
| 60 | 9.334564 | 12.047799 | 12.256518 |
| 65 | 9.499522 | 12.263085 | 12.498154 |
| 70 | 9.510696 | 12.275215 | 12.534580 |
| 75 | 9.382887 | 12.104205 | 12.384576 |
| 80 | 9.132325 | 11.771566 | 12.069988 |
| 85 | 8.775798 | 11.300571 | 11.613111 |
| 90 | 8.330168 | 10.713757 | 11.036751 |
| 95 | 7.811983 | 10.033859 | 10.363379 |
| 100 | 7.237299 | 9.282400 | 9.164402 |
| 105 | 6.621415 | 8.479736 | 8.810509 |
| 110 | 5.978875 | 7.645136 | 7.970995 |
| 115 | 5.323273 | 6.796481 | 7.113867 |
| 120 | 4.667292 | 5.950122 | 6.255793 |
| 125 | 4.022595 | 5.120805 | 5.411711 |
| 130 | 3.399830 | 4.322134 | 4.595450 |
| 135 | 2.808606 | 3.565959 | 3.819242 |
| 140 | 2.257495 | 2.862865 | 3.093794 |
| 145 | 1.754088 | 2.222102 | 2.428740 |
| 150 | 1.304957 | 1.651597 | 1.832149 |
| 155 | 0.915686 | 1.157986 | 1.311053 |
| 160 | 0.590967 | 0.746882 | 0.871169 |
| 165 | 0.334553 | 0.422597 | 0.517161 |
| 170 | 0.149363 | 0.188640 | 0.252631 |
| 175 | 0.037443 | 0.047293 | 0.080211 |
| 180 | 0.000000 | 0.000000 | 0.001528 |

From the foregoing, it will be appreciated that, at an angle of 70°, a maximum percentage increase in compression is demonstrated when compared to a rod and crank engine and that when the straight, curved and offset curved versions of a yoke engine are compared with each other, the offset curved yoke demonstrates the greatest percentage increase in compression over a rod and crank engine.

Changing the parameters somewhat to provide a relative yoke arc radius of 10 produces the following:

COMPRESSION RATIO: 11.000000
STROKE LENGTH: 2.500000
ROD LENGTH: 5.080000
RELATIVE YOKE ARC OFFSET: −1.000000
RELATIVE YOKE ARC RADIUS: 10.000000
CRANK RADIUS FOR ROD: 1.250000
CRANK RADIUS FOR OFFSET YOKE: 1.243671
ABSOLUTE YOKE ARC OFFSET: −1.243671
ABSOLUTE YOKE ARC RADIUS: 12.436707

| | PERCENTAGE INCREASE IN COMPRESSION OF YOKES OVER ROD AND CRANK | | |
|---|---|---|---|
| ANGLE | STRAIGHT | CURVED | OFFSET CURVED |
| 0 | 0.000000 | 0.000000 | 0.000000 |
| 5 | 0.185524 | 0.261088 | 0.239366 |
| 10 | 0.720416 | 1.016129 | 0.975937 |
| 15 | 1.544709 | 2.185783 | 2.134242 |
| 20 | 2.573141 | 3.655689 | 3.603659 |
| 25 | 3.711330 | 5.296124 | 5.256440 |
| 30 | 4.870079 | 6.980946 | 6.967551 |
| 35 | 5.974859 | 8.601119 | 8.627192 |
| 40 | 6.969843 | 10.071464 | 10.148870 |
| 45 | 7.818007 | 11.333005 | 11.471002 |
| 50 | 8.498560 | 12.350014 | 12.555511 |
| 55 | 9.003582 | 13.106914 | 13.383336 |
| 60 | 9.334564 | 13.602912 | 13.951143 |
| 65 | 9.499522 | 13.848592 | 14.266813 |
| 70 | 9.510696 | 13.861835 | 14.345834 |
| 75 | 9.382887 | 13.665303 | 14.209166 |
| 80 | 9.132325 | 13.284408 | 13.880675 |
| 85 | 8.775798 | 12.745595 | 13.385745 |
| 90 | 8.330168 | 12.075617 | 12.750444 |
| 95 | 7.811983 | 11.300519 | 12.000377 |
| 100 | 7.237299 | 10.445320 | 11.160524 |
| 105 | 6.621415 | 9.533625 | 10.254498 |
| 110 | 5.978875 | 8.587520 | 9.304661 |
| 115 | 5.323273 | 7.627220 | 8.331758 |
| 120 | 4.667292 | 6.671283 | 7.354722 |
| 125 | 4.022595 | 5.736399 | 6.390985 |
| 130 | 3.399830 | 4.837599 | 5.456112 |
| 135 | 2.808606 | 3.988072 | 4.563995 |
| 140 | 2.257495 | 3.199405 | 3.726988 |
| 145 | 1.754088 | 2.481637 | 2.955697 |
| 150 | 1.304957 | 1.843412 | 2.259429 |
| 155 | 0.915686 | 1.291842 | 1.645977 |
| 160 | 0.590967 | 0.832818 | 1.121881 |
| 165 | 0.334553 | 0.471064 | 0.692369 |
| 170 | 0.149363 | 0.210193 | 0.361670 |
| 175 | 0.037443 | 0.052673 | 0.132841 |
| 180 | 0.000000 | 0.000000 | 0.007868 |

COMPRESSION RATIO: 11.000000
STROKE LENGTH: 2.500000
ROD LENGTH: 5.080000
RELATIVE YOKE ARC OFFSET: −0.500000
RELATIVE YOKE ARC RADIUS: 10.000000
CRANK RADIUS FOR ROD: 1.250000
CRANK RADIUS FOR OFFSET YOKE: 1.248422
ABSOLUTE YOKE ARC OFFSET: −0.624211
ABSOLUTE YOKE ARC RADIUS: 12.484218

| | PERCENTAGE INCREASE IN COMPRESSION OF YOKES OVER ROD AND CRANK | | |
|---|---|---|---|
| ANGLE | STRAIGHT | CURVED | OFFSET CURVED |
| 0 | 0.000000 | 0.000000 | 0.000000 |
| 5 | 0.185524 | 0.261088 | 0.276431 |
| 10 | 0.720416 | 1.016129 | 1.847792 |

-continued

COMPRESSION RATIO: 11.000000
STROKE LENGTH: 2.500000
ROD LENGTH: 5.080000
RELATIVE YOKE ARC OFFSET: −0.500000
RELATIVE YOKE ARC RADIUS: 10.000000
CRANK RADIUS FOR ROD: 1.250000
CRANK RADIUS FOR OFFSET YOKE: 1.248422
ABSOLUTE YOKE ARC OFFSET: −0.624211
ABSOLUTE YOKE ARC RADIUS: 12.484218

PERCENTAGE INCREASE IN COMPRESSION OF YOKES OVER ROD AND CRANK

| ANGLE | STRAIGHT | CURVED | OFFSET CURVED |
|---|---|---|---|
| 15 | 1.544709 | 2.185783 | 2.236187 |
| 20 | 2.573141 | 3.655689 | 3.728337 |
| 25 | 3.711330 | 5.296124 | 5.394721 |
| 30 | 4.870079 | 6.980946 | 7.109670 |
| 35 | 5.974859 | 8.601119 | 8.763111 |
| 40 | 6.969843 | 10.071464 | 10.269614 |
| 45 | 7.818007 | 11.333005 | 11.568680 |
| 50 | 8.498560 | 12.350014 | 12.623622 |
| 55 | 9.003582 | 13.106914 | 13.417630 |
| 60 | 9.334564 | 13.602912 | 13.948878 |
| 65 | 9.499522 | 13.848592 | 14.226883 |
| 70 | 9.510696 | 13.861835 | 14.268797 |
| 75 | 9.382887 | 13.665303 | 14.096688 |
| 80 | 9.132325 | 13.284408 | 13.735405 |
| 85 | 8.775798 | 12.745595 | 13.211254 |
| 90 | 8.330168 | 12.075617 | 12.550670 |
| 95 | 7.811983 | 11.300519 | 11.779785 |
| 100 | 7.237299 | 10.445320 | 10.923713 |
| 105 | 6.621415 | 9.533625 | 10.006194 |
| 110 | 5.978875 | 8.587520 | 9.049521 |
| 115 | 5.323273 | 7.627220 | 8.074230 |
| 120 | 4.667292 | 6.671283 | 7.099196 |
| 125 | 4.022595 | 5.736399 | 6.141500 |
| 130 | 3.399830 | 4.837599 | 5.216440 |
| 135 | 2.808606 | 3.988072 | 4.337593 |
| 140 | 2.257495 | 3.199405 | 3.516961 |
| 145 | 1.754088 | 2.481637 | 2.764895 |
| 150 | 1.304957 | 1.843412 | 2.090296 |
| 155 | 0.915686 | 1.291842 | 1.500637 |
| 160 | 0.590967 | 0.832818 | 1.002136 |
| 165 | 0.334553 | 0.471064 | 0.599757 |
| 170 | 0.149363 | 0.210193 | 0.297388 |
| 175 | 0.037443 | 0.052673 | 0.097780 |
| 180 | 0.000000 | 0.000000 | 0.002655 |

From the foregoing it will be observed that by increasing the relative arc radius, as compared to the percentage increase in compression over a rod and crank engine the arcuate and offset arcuate slotted yoke engines, have higher percentage increase of compression.

At any given equal operating speed, the engine according to the invention, has a lower peak piston acceleration (see Tables 2 and 3 below) than a wrist pin connecting rod engine. Thus, despite the greater mass of the piston and yoke assembly over a piston, wrist pin, and connecting rod assembly, the yoke assembly could weigh 1022.25 grams and have the same maximum bearing load as the Chrysler 2.2 assembly weighing 782 grams (refer to Table II).

In the engine of the invention, vibration is inherently low and can be virtually eliminated because of the substantially sinusoidal motion of the piston. Since the sum of two sine waves is substantially zero, it is possible to achieve substantially perfect balancing in a conventional in-line four cylinder design, employing a yoke-piston arrangement according to the invention.

TABLE 2

Functions Determining Piston Travel, Speed and Acceleration

| Function: | Rod and Crank: | Yoke |
|---|---|---|
| Piston | $r - r \cdot \cos\theta + l - (l^2 - (r \cdot \sin\theta)^2)^{\frac{1}{2}}$ | $r - r \cdot$ |

TABLE 2-continued

Functions Determining Piston Travel, Speed and Acceleration

| Function: | Rod and Crank: | Yoke |
|---|---|---|
| Travel: | | $\cos\theta$ |
| Speed: (first derivative) | $r \cdot \sin\theta + r^2 \cdot (l^2 - (r \cdot \sin\theta)^2)^{\frac{1}{2}} \cdot \sin\theta \cdot \cos\theta$ | $r \cdot \sin\theta$ |
| Acceleration: (second derivative) | $r \cdot \cos\theta + r^2 \cdot ((l^2 - (r \cdot \sin\theta)^2)^{-\frac{1}{2}} \cdot (\cos^2\theta - \sin^2\theta) + (l^2 - (r \cdot \sin\theta)^2)^{-3/2} \cdot r^2 \cdot \sin^2\theta \cdot \cos^2\theta)$ | $r \cdot \cos\theta$ |

Constants:
$l$ = length of the connecting rod on Chrysler 2.2 = 5.9″
$r$ = crank radius for either Chrysler 2.2 or Invention = 1.318″
Maximum speed in both designs occurs at 90° before or after TDC (cos = 0) while maximum acceleration occurs around TDC (sin = 0), which is the relevant phase of crank rotation for analyzing wrist pin and bearing load.

TABLE 3

A Comparative Analysis of Bearing Load

| | Parameter: | (Chrysler 2.2) Piston, Wrist Pin, and Top of Connecting Rod[1]: | Piston and Yoke, Not Including Sliding Block[1]: |
|---|---|---|---|
| (1) | Mass: | 782 grams | 1022.25 grams* |
| (2) | Maximum Acceleration: | 2.37** | 1.813** |
| (3) | Mass Times Max. Acceleration: | 1853.34 | 1853.34 |

Bearing load is a function of the change in kinetic energy, which is related to acceleration. It is peak piston acceleration, not speed, which determines bearing load.

[1]In this model, linear motion is considered but not rotational motion, which can be counterbalanced on the crank. Thus, the lower end of the connecting rod and the sliding block in the yoke assembly are not considered.
*Unknown constant which was solved for here.
**Found by solving for the second derivative when sin θ = 0.

To illustrate this, consider two engines which have the same peak piston velocity, but a first engine's piston(s) move in a smooth, harmonic motion while the pistons of a second rapidly accelerate and decelerate. The second engine would clearly have the greater maximum bearing load, vibration, and wear. Similarly, maximum bearing load occurs around 0° (TDC), where maximum piston acceleration occurs, not at 90° before or after TDC, where maximum piston velocity occurs.

From an inspection of Table 3, the data for which is developed using the relationship disclosed in Table 2, it will be apparent that given substantially equal mass time accelerations, and thus substantially equal vibration and bearing load characteristics, the piston/yoke assembly, less the sliding block, of the engine according to the invention may have a tolerably a larger mass than a comparable piston, wrist pin and top of connecting rod, for conventional engine, for example, a Chrysler 2.2.

The operation of the mechanism shown in FIG. 2 will be better understood from a consideration of FIGS. 2-A to 2-O which show schematically a comparison of the cycle of a conventional engine equipped with wrist pin and connecting rod to the engine of the invention, the latter employing a yoke in an arcuate slot, the center of the arc being off center with respect to the axis of the cylinder and located remote from the piston with respect to the crankshaft.

In FIG. 2-A, the piston and connecting rod are shown positioned at top dead center with respect to the axis 14 of the crankshaft. Rotation of the crankshaft as shown is clockwise.

Turning to the invention as shown in FIG. 2-C, that position of the sliding block 12 which is comparable to the top dead center position of the conventional engine is shown wherein the sliding block 12 is disposed with the center of the crank throw 13 diametrically opposite the center of curvature 200 of the arcuate slot such that the center of the crank throw 13, the center of the crankshaft 14 and the center of curvature 200 of the arcuate slot are in a straight line.

The showing of FIG. 2 and 2-A, wherein the top dead center, center of the crank shaft 14 and center of 200 of curvature for the slot are in a straight line, is exemplary only. The invention contemplates engine configurations which include those wherein the three points in question may not be in a straight line, as for example, for the given offset alpha ($\alpha$) shown in FIG. 2, radii of curvature for the slot which are shorter or longer than that shown will produce configurations where top dead center, the axis of the crank shaft 14 and the center of curvature 200 are not in a straight line.

Because of the offset of center 200 and the arcuate slot, the crank throw 13 in its clockwise rotation has not yet reached the axis z—z of the cylinder.

It will be appreciated that the motion of the sliding block 12 is analogous to the motion of a hypothetical connecting rod 200' of FIGS. 2 and 2-A shown in dotted lines. If such a hypothetical connecting rod were mounted to a yoke member 4 extended hypothetically as shown at 4' in dotted lines, FIG. 2-A, to provide a bearing about the center 200 then the connecting rod would oscillate back and forth within the arcuate excursion which is undertaken by the sliding block 12.

Such a hypothetical connecting rod 200', it will be appreciated, as shown in FIG. 2-A, is at top dead center with regard to the piston 2 attached to the yoke.

The position of the pistons at their top dead centers, highest point of rise, is shown respectively in FIG. 2-B at 221 for the wrist pin/connecting rod engine and at 222 for the offset arcuate slot yoke engine of the invention.

FIG. 2-B shows the connecting rod engine, the crankshaft having rotated substantially 90°, the piston having moved, as shown at 221. A comparable 90° rotation of the crankshaft in the yoke engine of the invention, shown in FIG. 2-F, causes the sliding block 12 to assume a position as shown, the yoke with attendant piston having advanced in the cylinder as shown at 222.

It will be observed that the 90° rotation of the crankshaft has caused significant differences in the displacement of the respective pistons of the two engines in the relationship of 1.426 to 1.088 as shown in FIG. 2-E at 221 and 222. Inasmuch as the piston at 222 has been displaced less than the piston at 221, it will be appreciated that at this point in the cycle of the two engines, the compression in the cylinder of the piston 222 is commensurately greater than that of the cylinder of piston 221.

FIGS. 2G to 2-I shows the configuration of the two engines when the conventional engine is at bottom dead center after a further rotation of 90° from the position shown in FIG. 2-D. The relationship of the respective piston movements, in FIG. 2-H, 221 and 222 being respectively 2.50 and 2.552.

Lastly, as shown in FIGS. 2-J to 2-L, when the crankshaft has moved 270° clockwise from top dead center of FIG. 2-A and the conventional engine has a connecting rod shown in FIG. 2-J, the yoke engine of the invention as shown in of FIG. 2-L presents a sliding block in a leftward excursion within the arcuate slot. At this point the departure of the pistons from top dead center for the two respective cylinders shown in FIG. 2-K at 221 and 222 are 1.426 for the conventional connecting rod engine and 1.221 for the yoke engine of the invention.

The piston of the engine of the invention has made a quicker return in comparison with the conventional engine.

The effect of the curvilinear character of the slot and also the effect of the offset position of the center 200 of curvature for the slot, as shown by FIGS. 2-A to 2-L, is to create an engine having a dynamic compression ratio, that is, a compression ratio which varies during the cycle of rotation of the crankshaft.

FIGS. 2-M to 2-O presents for consideration a comparison of the relationship of crank radius, C, to piston stroke length, S, for three configurations of slot. FIG. 2-M shows the relationship for a slotted yoke wherein the slot in the yoke extends at right angles to the direction of the cylinder axis.

FIG. 2-N shows the configuration and relationship between crank radius and stroke length for a straight slot tilted at an angle delta ($\Delta$) with respect to the cylinder axis.

FIG. 2-O, shows the relationship of the stroke length S and crank radius C wherein the yoke slot radius rs and the yoke slot center horizontal offset xs are shown.

Those skilled in the art will recognize that alternate equivalent structures may be employed for FIG. 2 in lieu of the slot in the yoke 3, 4 within which the sliding block 12 slides, without departing from the invention.

Stability of the yoke 3', 4, within the crankcase along axis z—z, FIG. 2, is effected by bearing members 15 and 15' positioned in planes which intersect a second axis which is in the plane of the paper and disposed substantially orthogonally with respect to z—z, planes of the bearing members 15 and 15' being parallel to the first axis z—z. The bearing members 15 and 15' are respectively mounted to the yoke members 3 and 4 by bolts 16 with attendant nuts 16' and 16'''.

Bearing member 15' engages a bearing plate 17 mounted to the crankcase housing member 7 as shown in FIG. 2. One or more such bearing plates 17 may be provided disposed along the wall 7. Bearing member 15 engages bearing shoe 11 received in crankcase housing at 9, movable along the axis n—n. Similarly, plural bearing shoes 11 may be provided disposed along the wall 9.

A port 10 which is connected to a pressure system of the engine, imparts pressure to the face 11' whereby bearing shoe 11 exerts pressure against bearing member 15, the effect being to cause the yoke members 3 and 4 to exert pressure by way of bearing member 15' against the plate 17 mounted to the opposite slide of the crankcase at 7. The result of the described effect, therefore, of the bearing arrangement is to stabilize the position of the yoke 3 and 4 within the crankcase housing along the axis n—n between the plate 17 and the bearing shoe 11.

While the embodiment disclosed has been described as employing oil pressure generated by a pressure source which may be an oil pump of the engine, it will be appreciated that any pressure source may be employed, pneumatic, electromagnetic, or the like imparted to the surface 11' of the bearing shoe 11, so long as such a pressure is effective to apply force to the yoke by way of member 15 to cause the yoke to bear against the plate 17, or, alternatively, a surface on the wall of the crankcase at 7 opposite the bearing shoe 11.

While continuous pressure by bearing shoe 11 may be effected in an alternative embodiment not shown by means of a spring disposed between the crankcase member 9 and the bearing shoe 11, such a configuration is subject to fatigue of the spring over long periods of operation. The embodiment disclosed therefore contemplates, as shown, application of lubricant or oil pressure applied to the bearing shoe 11, thereby avoiding the problem of fatigue presented by the alternative spring structure. Moreover, it will be appreciated that by use of application of continuous pressure applied to bearing shoe 11, stabilization of the yoke 3 will be effected regardless of the wear on members 15, 15', the face of 11 which engages 15, and the bearing plate face which engages member 15'. Thus, though wear may occur through long use, play between yoke and crankcase wall at 17 is either greatly reduced or virtually eliminated.

The embodiment described thus materially extends the operational life of the engine making disassembly for maintenance significantly less frequent than has heretofore been experienced in the operation of scotch yoke engines. An attendant reduction in maintenance costs is also experienced.

The disposition of the bearing members 15 and 15' is such that during the movement of the yoke 3, 4 from top dead center to bottom dead center, maximum pressure is effected by the bearing plate 15' against the plate 17 compared to pressure during the return stroke, the crankshaft rotation being in the direction indicated by the arrow 19. Inasmuch as the bearing member 15' is mounted at the leading edge of the yoke 4 by nut and bolt 16, 16', the bearing member 15', during maximum pressure, is under tension, for the particular direction of rotation of the crankshaft shown by arrow 19.

By the same token, on the return stroke maximum pressure is experienced by bearing member 15 which is mounted to the yoke member 3 by the bolt 16", the bearing member 15 being under tension during the return stroke to top dead center. Thus, the bearing members 15 and 15' being under tension during their periods of maximum pressure do not experience a tendency to buckle.

If the direction of rotation were reversed, the mounting of the bearing members 15 and 15' may be reversed to maintain the same condition of tension during maximum bearing pressure.

In an alternate embodiment not shown, bearing members 15 and 15' may be dispensed with, the sides 3x, 3y, 4x and 4y, of the yoke members 3 and 4 serving as bearing surfaces, engaging bearing shoe 11 and plate 17.

In still another modification, not shown, bearing plate 17 may be dispensed with, the yoke member bearing directly on the side of the crankcase. Experience has shown that machining crankcase surfaces to a satisfactory precision requires close tolerances over a significantly large surface so that advantageously, a bearing plate with relatively limited machined surface made of an appropriate material, an example of which will be described later, has been found to be entirely satisfactory.

Inasmuch as the yoke 3, 3', 4 and piston 2 are stabilized as to position for example, by the walls 1 of the cylinder and by means of the plate 17 and bearing shoe 11 in the embodiment shown, the need for reliance upon an extensive piston skirt as a stabilizing mechanism for the piston is substantially reduced so that the piston itself requires little or no skirt, making it possible to effect a further reduction in piston weight and in the distance between the yoke 3, 3' and 4 and the piston 2. It is thus possible to configure a piston and yoke whose axial dimension along the cylinder axis is minimal, allowing only for piston rings 2' to seal against the cylinder wall 1, the neck 3' of the yoke member 3 being shortened so that the piston 2 barely clears the surface of revolution described by the crankshaft and crank throw 13.

Yoke member 3 may be recessed as shown at 3' for the purposes of reducing weight and for economizing on material.

FIG. 3 shows the sliding block generally designated by the reference 12 composed of two half blocks 38 and 39. As shown, for example, in FIG. 3, the halves 38 and 39 of the sliding block 12 are retained in position relative to each other by the crank throw 13' and the upper and lower members 3 and 4 respectively, of the yoke 3, 3', 4.

A shoulder 32 retains and centers sliding block 12 and yoke members 3 and 4 with respect to the crankshaft and crank throw 13'. The outer surface of the crank throw 13' engages, in journal bearing manner, the cylindrical surface 31 provided by the members 38 and 39. A circular recess 36 is introduced to the cylindrical surface 31, which recess 36 is located to register with a lubrication port 13" exiting the crank throw 13' of FIG. 2. Recess 36 and shoulder 32 are shown in FIG. 3-A, a view of surface 35 of half-block 39. The top and bottom of the half blocks 38 and 39 have surfaces recessed at 33, the surface of 33 serving as a sliding bearing engaging corresponding surfaces of yoke members 3 and 4.

Ridges 40 retain the half blocks 38 and 39 in registration with the surfaces of the yoke members 3 and 4, which ridges 40 ride on the sides of the yoke members 3 and 4. Ridges 40, in retaining the half blocks 38 and 39 serve also to prevent twist of the yoke about the cylinder axis z—z, best shown in FIG. 2. As a result of the ridges 40, the stabilization of the yoke 3, 4 in its movement along the cylinder axis z—z, and in its engagement with bearing plate 17 and bearing shoe 11 is improved, notwithstanding the fact that, in extended operation, parts of the engine may wear which would tend to destabilize the position of the yoke 3 during its movement along the axis z—z.

From the periphery of cylindrical surface 31, lubrication holes 34 radiate to communicate with the recessed surfaces 33 by way of cross channels 41 so that lubricant emitted by the lubrication port 13" in the crank throw 13', FIG. 2, and dispersed across the cylindrical surface 31 as a journal bearing, will in addition find egress by way of the channel 36 and lubricant holes 34 to reach the surfaces 33 at channels 41, thence across the full width of the surfaces 33 by means of cross channels 41, to lubricate the interior sides of the ridges 40 and the engaging surfaces of the sides of yoke members 3 and 4 by means of recesses 42 in the ridges 40.

The recess 36 provides that, as the crank throw 13' rotates, no matter where the oil port 13" from the crank throw 13' is positioned with respect to the cylindrical surface 31, lubricant from the crank throw port 13" will exit the throw into the recess 36 continually, providing lubrication under substantially constant pressure.

This is in contrast to the lubrication of intermittent pressure disclosed in the prior art wherein the rotation of the crank throw with respect to the sliding block causes blocking of transmission of lubrication from the crank throw lubrication port during most of the rotation, affording direct registration of sliding block lubrication channels with the crank throw oil port only for brief instants.

FIG. 4 shows a section of a sliding block, 38 and 39 as shown in FIG. 3, sectioned through the cross channels 41 to show recesses 42.

FIG. 5 shows a detail of the yoke 3, in section through the cross channel 41, engaging one sliding block half 38 at the surface 33. The distance between 33 and 38 is shown much enlarged for clarity. The cross channel 41 which receives the lubricant from hole 34 communicates, at 46, with recessed channel 42 in the side of the ridge 40 thereby providing lubricant to the clearance space, shown much enlarged for clarity, between the ridge 40 and the side 45 of the yoke 3 which FIG. 5 shows details for yoke member 3, it will be appreciated that a comparable configuration will obtain for yoke member 4.

It will be seen therefore that, according to the invention all bearing surfaces of crank throw 13', sliding block 12 and yoke 3, 4, are provided with continuous lubricant pressure assuring maximum expectancy of long life with minimum wear.

FIGS. 6 and 7 show, respectively, side and end views of a bearing member, such as 15, which, as shown in FIG. 2, may be anchored to the yoke by means of bolts such as 16 or 16" through a hole 15a. The bearing surface 15c of the bearing member 15 engages the bearing shoe 11, as shown in FIG. 2. The bearing member 15', as shown in FIG. 2, which engages the bearing plate 17 may have a configuration similar to that shown in FIGS. 6 and 7.

FIGS. 8 and 9 show, respectively, a top and side view of the bearing shoe 11 of FIG. 2. A pressure, for example, lubricant pressure from the lubricant line of the engine is applied at the surface 11', thereby transmitting pressure of the shoe 11" of the bearing shoe 11 to engage the bearing member 15 at the surface 11'''.

By the embodiment as described, it is possible, to stabilize the movement of the yoke along the axis z—z, as shown in FIG. 2, by means of containment of the yoke 3 and 4, together with its bearing members 15 and 15' between the bearing plate 17 and the bearing shoe 11.

From the foregoing, it will be apparent that the embodiment contemplates employment of a pressure to facilitate the operation of the yoke 3, 4 in its movement along the axis z—z in FIG. 2, both to stabilize the yoke throughout a single stroke from continuous pressure by means of the bearing shoe, and to stabilize the yoke throughout extended operation over a long period of time by subjecting the bearing surfaces of the yoke 3, 4 and sliding block 12 to continuous lubrication of substantially constant pressure.

FIG. 10 is a schematic diagram of cylinder assemblies 100 juxtaposed to each other to form a multi-cylinder engine shown generally by the reference numeral 110. Such a multi-cylinder configuration may assume the "in-line" configuration or, alternatively, may assume the V-type configuration conventional to some automotive engines and the like. Alternatively, it will be appreciated by those skilled in the art that the cylinders may assume any position around the axis of the crankshaft 12, as shown in FIG. 2, accommodation being made for carburetion and ignition timing effected in accordance with practice well known to those skilled in the art.

Concerning the elements which bear upon one another described with regard to the foregoing description for FIGS. 2-10, where two members bear, one upon each other, it is expedient to employ for one or both of the engaging elements, an alloy known as "BEARIUM" TM, a product of Bearium Metals Corporation, 1170 Chili Avenue, Rochester, N.Y. 14624. This substance, when employed, either as a bearing shoe 11, bearing members 15 and 15', bearing plate 17 sliding block 12, peg 41 or ring 81, serves as a most effective bearing, both for withstanding excessive loads and for extending bearing life and hence the life of the engine.

BEARIUM TM metal is manufactured in a variety of alloys:

| Alloy | % Cu | % Pb | % Sn | % Ni |
|-------|------|------|------|------|
| B4    | 70   | 26   | 4    | 0    |
| B8    | 70   | 22   | 8    | 0    |
| B10   | 70   | 20   | 10   | 0    |
| B11   | 70   | 20*  | 9*   | 1*   |

*approximate

Alloy B10 has been found to be excellent for use as a sliding block, bearing plate and bearing shoe.

The advantages of the invention over the disclosures of the prior art are better understood by an analysis of the configuration of the invention compared to prior art teachings. For this purpose, FIGS. 11-15 are helpful. As an example of the prior art, the disclosure of the Buhl Pat. No. 1,349,660, previously referred to is taken as a starting point. It will be appreciated from a consideration of FIG. 1 of Buhl that the radius of curvature of the Buhl arc of the slot 6 is very short. Buhl contemplates, as disclosed in FIGS. 1 and 2 of the patent, a radius of curvature which is less than the diameter of the cylinder, the center of curvature being located within the cylinder.

A comparison of the performance of the Buhl engine with that of the invention here disclosed, in order to be meaningful, requires that many of the parameters of both Buhl and the invention be maintained substantially identical with only the significantly distinct parameters being allowed to vary. For the purpose of comparing the Buhl structure with that of the invention, attention is directed to schematic FIG. 11 wherein the piston 2 is shown connected to a yoke indicated schematically as ¾ with the center of the crankshaft at 14 and the center of the crank throw 13.

For the Buhl geometry, two centers of arc curvature are disclosed, namely, 500 and 501 having radii of curvature comparable to that of the engine of the invention. The center of curvature 500 corresponds to that disclosed in Buhl for a direction of rotation of the crankshaft 14 which is clockwise as shown by the arrow 503.

For the invention two centers of curvature for an arc in the slot of a yoke are shown respectively at 504 and 505.

The distances from the center of the crank throw 13 to each of the centers of curvature 500, 501, 504 and 505 have been selected as equal.

Figure 11:
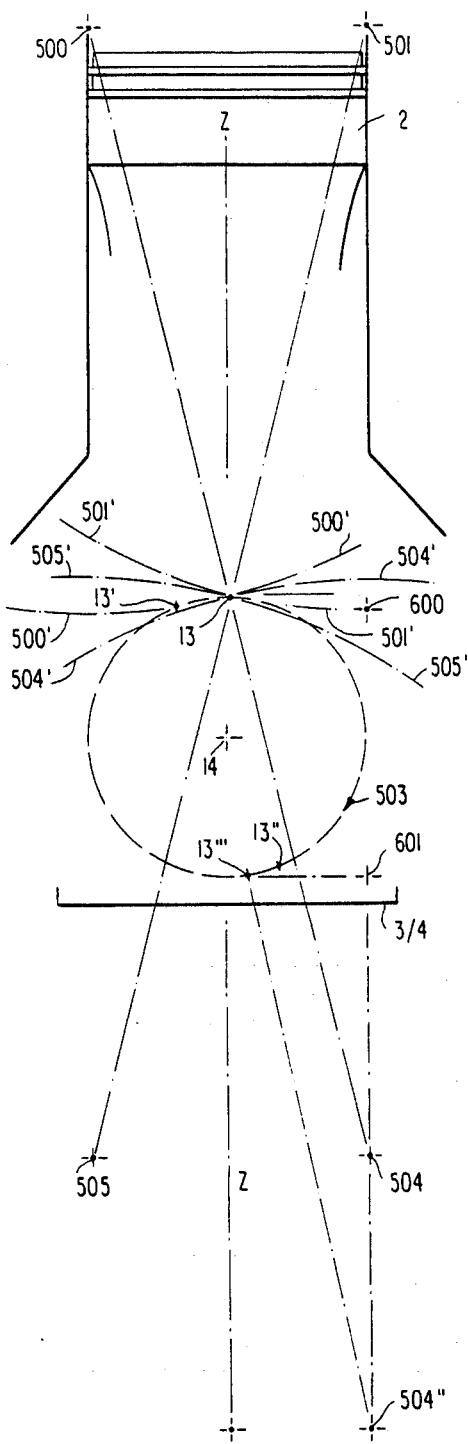

As shown in FIG. 11, the center of the crank throw 13 is depicted as being on the axis z—z for the purposes of demonstrating the manner in which the parameters of the Buhl engine and the engine of the invention have been made similar for the purposes of discussion, that is, the offsets of the centers of curvature and the radius of the arc of the slot for each respective engine. It will be observed, however, as shown, the position of 13 is not at top dead center for the Buhl engine or the engine of the invention.

Thus, the configuration shown in FIG. 11 provides a common crankshaft position and direction of rotation, a common magnitude of crank throw, a common cylinder diameter and common distances to the centers of curvature for arcs in possible slots for both the Buhl engine and that of the invention.

With the foregoing configuration in mind, a yoke in the Buhl engine having a center of curvature of 500 will have an arc for its slot configured as 500' in FIG. 11 while a Buhl engine with a center of curvature at 501 will have a yoke arc configured along the arc 501'.

Similarly, an engine according to the invention having a center of curvature at 504 will have an arc for the slot in the yoke configured at 504' and another alternative, according to the engine, having a center of curvature at 505 would have an arc in the yoke configured along the line 505'.

It will be seen therefore that the relationship of the arcs of slots bring about substantial differences in the operation of an engine due to the positional relation of the center of curvature of the arc, and the radius of the arc, with the respective positions which the crank throw takes for a particular direction of rotation of the crankshaft. The differences referred to, in turn, significantly affect the amount of piston displacement so that, for any particular position of the crank throw, by virtue of the different positional locations of the centers of curvature of the arcs of the yoke slots of the alternative configuration shown in FIG. 11, significant differences will be present in the piston displacement together with an attendant difference in compression.

The relationship of piston displacement between the alternatives for the Buhl engine having centers of curvature at 500 and 501 in FIG. 11 will now be compared with a configuration of an engine according to the invention having a center of curvature at 504 in the discussion of FIGS. 12-16 which follow.

It will be appreciated that a similar analysis could be made for engines according to Buhl and according to the invention having centers of curvature with different offsets and different distances to the center of the crank throw. For an engine according to the invention, an example of such a center of curvature would be 505. For economy of explanation, only the center of curvature 504 will be discussed in connection with Buhl's centers of curvature 500 and 501.

Piston displacement for the prior art engine and the engine according to the invention may be calculated employing formulae in Table 2.

TABLE 4

Computation of Piston Travel (See FIGS. 11-15)

| | IMPROVED DYNAMIC COMPRESSION RATIO ENGINE (Yoke arc center below) | MODIFIED BUHL STRUCTURE (Yoke arc center above) |
|---|---|---|
| Crank Angle (from vertical at TDC | $\theta = -\mathrm{ARCSIN}\left(\dfrac{rc}{rs - rc}\right)$ | $\theta = \mathrm{ARCSIN}\left(\dfrac{rc}{rs + rc}\right)$ |
| Piston travel from TDC as function of angle of crank rotation past $\theta$ | $y = rc \cdot \cos\theta - \sqrt{rs^2 - (rc \cdot \sin\theta - xs)^2} - (rc \cdot \cos(\theta + \alpha) - \sqrt{rs^2 - (rc \cdot \sin(\theta + \alpha) - xs)^2})$ | $y = rc \cdot \cos\theta + \sqrt{rs^2 - (rc \cdot \sin\theta - xs)^2} - (rc \cdot \cos(\theta + \alpha) + \sqrt{rs^2 - (rc \cdot \sin(\theta + \alpha) - xs)^2})$ |

| | SYMBOL | MEANING |
|---|---|---|
| Variables | y | piston travel |
| | α | angle of crank rotation past 0 |
| | θ | crank angle at TDC |
| | rc | radius of crank bearing path |
| Constants | rs | radius of yoke slot arc |
| | xs | horizontal offset of yoke slot arc center |
| | l | length of the connecting rod |
| | r | crankpin offset radius for the connecting rod engine |

FIGS. 12 and 13 show schematically a comparison of an engine according to the invention having a center of curvature located at 504 of FIG. 11 with a Buhl engine having a center of curvature positioned at 500, as shown in FIG. 11. In FIG. 12-A, for top dead center, 0°, the crank throw is positioned at 13 in its excursion around the center of the crankshaft 14 and the arc for the center of curvature 504 is shown at 504', tangent to the circle described by the center of the crank throw 13.

The comparable position for top dead center for the Buhl center of curvature 500 is shown in FIG. 12-C for 0° wherein the arc for the center of curvature 500 is shown at 500', again tangent to the circle described by the crank throw 13.

It will be observed that a comparison of 0° in FIGS. 12-A with 0° in FIG. 12-C, the angle measured from the cylinder axis z—z is different for the two engines not withstanding similar offset distances and radii of curvature. This is because the point of tangency which determines top dead center occurs at different angles with respect to the cylinder axis z—z although the points 500 and 504 are shown in FIG. 11 to be symmetrical from the position of the crank throw 13 as there shown. Put another way, given an identical offset of the respective centers of curvature 500 and 504 from the axis of the cylinder z—z and an identical radius of curvature of the slot for both engines, the point of tangency with the circle described by the center of the crank throw will occur at different points along the circle described by the center of the crank throw. Top dead center, that is,

UNITED STATES PATENT AND TRADEMARK OFFICE
CERTIFICATE OF CORRECTION

PATENT NO. : 4,584,972

DATED : April 29, 1986

INVENTOR(S) : Jayne, et al.

It is certified that error appears in the above-identified patent and that said Letters Patent is hereby corrected as shown below:

Column 6, line 1, "prints" should read --points--.

Column 8, line 41, the line reading "ROD LENGTH:  5.000000" should read --ROD LENGTH:  5.080000--.

Column 9, line 3, the line reading "ROD LENGTH:  5.000000" should read --ROD LENGTH:  5.080000--;

Column 9, line 28, the line reading "ROD LENGTH:  5.000000" should read --ROD LENGTH:  5.080000--.

Column 14, line 16, "presents" should read --present--.

Column 17, line 17, "yoke 3 which" should read --yoke 3.  While--.

Column 22, line 36, "15-L" should read --15-I--.

Column 24, line 48, after "curved surface" insert --formed by said curvilinear slotted means--;

UNITED STATES PATENT AND TRADEMARK OFFICE
CERTIFICATE OF CORRECTION

PATENT NO. : 4,584,972

DATED : April 29, 1986

INVENTOR(S) : Jayne, et al.

It is certified that error appears in the above-identified patent and that said Letters Patent is hereby corrected as shown below:

Column 6, line 1, "prints" should read --points--.

Column 8, line 41, the line reading "ROD LENGTH: 5.000000" should read --ROD LENGTH: 5.080000--.

Column 9, line 3, the line reading "ROD LENGTH: 5.000000" should read --ROD LENGTH: 5.080000--;

Column 9, line 28, the line reading "ROD LENGTH: 5.000000" should read --ROD LENGTH: 5.080000--.

Column 14, line 16, "presents" should read --present--.

Column 17, line 17, "yoke 3 which" should read --yoke 3. While--.

Column 22, line 36, "15-L" should read --15-I--.

Column 24, line 48, after "curved surface" insert --formed by said curvilinear slotted means--;

UNITED STATES PATENT AND TRADEMARK OFFICE
CERTIFICATE OF CORRECTION

PATENT NO. : 4,584,972
DATED : April 29, 1986
INVENTOR(S) : Jayne, et al.

It is certified that error appears in the above-identified patent and that said Letters Patent is hereby corrected as shown below:

Column 24, line 51, after "curved surface" insert --formed by said curvilinear slotted means.

Signed and Sealed this

Twenty-third Day of September 1986

[SEAL]

Attest:

DONALD J. QUIGG

Attesting Officer     Commissioner of Patents and Trademarks